US008942441B2

(12) United States Patent
Nielsen et al.

(10) Patent No.: US 8,942,441 B2
(45) Date of Patent: Jan. 27, 2015

(54) OPTIMIZING THE INITIALIZATION AND CONVERGENCE OF ACTIVE CONTOURS FOR SEGMENTATION OF CELL NUCLEI IN HISTOLOGICAL SECTIONS

(75) Inventors: Birgitte Nielsen, Oslo (NO); John Maddison, Sussex (GB); Havard Danielsen, Oslo (NO)

(73) Assignee: Institute for Medical Informatics, Oslo (NO)

( * ) Notice: Subject to any disclaimer, the term of this patent is extended or adjusted under 35 U.S.C. 154(b) by 992 days.

(21) Appl. No.: 13/045,859

(22) Filed: Mar. 11, 2011

(65) Prior Publication Data

US 2011/0274336 A1    Nov. 10, 2011

(30) Foreign Application Priority Data

Mar. 12, 2010   (GB) .................................. 1004130.9

(51) Int. Cl.
*G06K 9/00* (2006.01)
*G06T 7/00* (2006.01)

(52) U.S. Cl.
CPC ............ *G06K 9/0014* (2013.01); *G06T 7/0081* (2013.01); *G06T 7/0083* (2013.01); *G06T 2207/10056* (2013.01); *G06T 2207/20032* (2013.01); *G06T 2207/20116* (2013.01); *G06T 2207/20141* (2013.01); *G06T 2207/20148* (2013.01); *G06T 2207/20156* (2013.01); *G06T 2207/30024* (2013.01)
USPC ........... 382/128; 382/133; 382/199; 382/203; 382/224

(58) Field of Classification Search
USPC ........................ 382/128, 133, 199, 203, 224
See application file for complete search history.

(56) References Cited

U.S. PATENT DOCUMENTS

| 5,687,251 | A * | 11/1997 | Erler et al. ..................... 382/133 |
| 5,978,497 | A * | 11/1999 | Lee et al. ...................... 382/133 |
| 6,252,985 | B1 * | 6/2001 | Mitsunaga et al. ........... 382/199 |
| 7,450,762 | B2 * | 11/2008 | Morell .......................... 382/199 |
| 8,369,590 | B2 * | 2/2013 | Wang et al. .................... 382/128 |
| 2005/0136549 | A1 * | 6/2005 | Gholap et al. ................ 436/501 |
| 2005/0202404 | A1 * | 9/2005 | Wittenberg et al. .............. 435/4 |
| 2005/0207633 | A1 * | 9/2005 | Arini et al. .................... 382/133 |
| 2005/0260583 | A1 * | 11/2005 | Jackway et al. .................. 435/6 |
| 2006/0083418 | A1 * | 4/2006 | Watson et al. ................ 382/133 |

(Continued)

OTHER PUBLICATIONS

Ø.D. Trier and A.K. Jain, "Goal-directed evaluation of binarization methods", IEEE Trans on Pattern Analysis and Machine Intelligence 17 (1995), 1191-1201.

(Continued)

*Primary Examiner* — Matthew Bella
*Assistant Examiner* — Julian Brooks
(74) *Attorney, Agent, or Firm* — Leason Ellis LLP

(57) ABSTRACT

A computer-implemented segmentation method is used to process an image representing a plurality of nuclei. The method is implemented in a computer having a processor and a physical memory. A set of instructions are provided to the processor the physical memory of the computer. The processor is configured by executing the set of instructions in the physical memory so as to automatically segment the image by: thresholding a grey-scale image to create a black and white image; identifying objects in the black and white image and removing objects failing to meet predetermined criteria; extracting objects; and applying an edge detector on the segmented image to identify the edges of the nuclei. Overlapping nuclei are split to improve results.

13 Claims, 9 Drawing Sheets

(56) References Cited

U.S. PATENT DOCUMENTS

| | | | |
|---|---|---|---|
| 2006/0127881 A1* | 6/2006 | Wong et al. | 435/4 |
| 2006/0285743 A1* | 12/2006 | Oh et al. | 382/170 |
| 2008/0144895 A1* | 6/2008 | Hunter et al. | 382/128 |
| 2009/0074283 A1* | 3/2009 | Ramm et al. | 382/133 |
| 2010/0080439 A1* | 4/2010 | Karam et al. | 382/133 |
| 2010/0111398 A1 | 5/2010 | Mitra et al. | |
| 2010/0290692 A1* | 11/2010 | Macaulay et al. | 382/133 |
| 2011/0038523 A1* | 2/2011 | Boardman | 382/133 |

OTHER PUBLICATIONS

Xu, Chenyang, et al., "Active Contours, Deformable Models, and Gradient Vector Flow". IACL, Jul. 3, 2012, http://iacl.ece.jhu.edu/projects/gvf, pp. 1-7.

Xu and Prince, "Gradient Vector Flow: A New External Force for Snakes", IEEE Proc. Conf. on Comp. Vis. Patt. Recog.(CVPR'97) pp. 66-71.

E. Bengtsson, C. Wahlby and J. Lindblad, "Robust cell image segmentation methods", Pattern Recognition and Image Analysis 14 (2004), 157-167.

M. Kass, A. Witkin and D. Terzopoulos, "Snakes—Active contour models", Int J Comput Vision 1 (1988), 321-331.

T. McInerney and D. Terzopoulos, "Deformable models in medical image analysis: a survey", Medical Image Analysis 1 (1996), 91-108.

Ø.D. Trier and T. Text, "Evaluation of binarization methods for document images", IEEE trans on Pattern Analysis and Machine Intelligence 17 (1995), 312-315.

C. Xu and J.L. Prince, "Snakes, shapes, and gradient vector flow", IEEE Trans Imag Proc 7 (1998), 359-369.

\* cited by examiner (a)

(b)

(c)

(d)

(a)

(b)

(c)

(d)

(e)

(f)

(g)

(h)

(i)

(a)

(b)

(c)

(d)

ers of a computer. The code can comprise software instructions that are provided to a physical memory that is accessible to the processor of the computer.

OPTIMIZING THE INITIALIZATION AND CONVERGENCE OF ACTIVE CONTOURS FOR SEGMENTATION OF CELL NUCLEI IN HISTOLOGICAL SECTIONS

This patent application claims priority under 35 U.S.C. Section 119 from Great Britain Patent Application 1004130.9, filed Mar. 12, 2010, which is hereby incorporated by reference as if set forth in its entirety herein.

FIELD OF THE INVENTION

The present invention relates to image processing and, more particularly, to a segmentation method that processes an image to identify edges of each of a plurality of nuclei and processing the so-identified nuclei.

BACKGROUND OF THE INVENTION

Image segmentation is the process of dividing a digital image into meaningful regions, and is generally the first step in automated image analysis. The objects of interest are extracted from the image for subsequent processing, such as description and recognition. In general, segmentation is one of the most important and most difficult steps in automated image analysis. The success or failure of the image analysis task is often a direct consequence of the success or failure of the segmentation.

Nuclear image analysis is one of the main application fields of automated image analysis and is a useful method to obtain quantitative information for the diagnosis and prognosis of human cancer. In segmentation of cell nuclei the complexity of the problem largely depends on the type of specimen. Nuclei in cytological specimens may be segmented by simple automatic gray level thresholding. Nuclei in tissue sections, however, are in general very difficult to segment by purely automatic means. It may be necessary to use interactive techniques in order to obtain sufficient quality as discussed in E. Bengtsson, C. Wahlby and J. Lindblad, "Robust cell image segmentation methods", Pattern Recognition and Image Analysis 14 (2004), 157-167. Bengtsson et al. discussed the relative advantages of different approaches to cell segmentation.

Active contour models or snakes are widely used in medical image segmentation. See M. Kass, A. Witkin and D. Terzopoulos, "Snakes—Active contour models", Int J Comput Vision 1 (1988), 321-331 and T. Mclmemey and D. Terzopoulos, "Deformable models in medical image analysis: a survey", Medical Image Analysis 1 (1996), 91-108.

Active contours were originally designed as interactive models and the idea behind active contours for image segmentation is quite simple; 1) the user specifies an initial guess for the contour, 2) the contour is then moved by image driven forces to the boundary of the object. However, one general problem related to these algorithms is that the initial contour needs to be relatively close to the target object boundary in order to get convergence. This is known as the "capture range problem".

Xu and Prince suggested a method for increasing the capture range of the external gradient vector field, in C. Xu and J. L. Prince, "Gradient Vector Flow (GVF) Active Contour Toolbox", down-loaded from: http://iacl.ece.jhu.edu/projects/gvf and C. Xu and J. L. Prince, "Snakes, shapes, and gradient vector flow", IEEE Trans Imag Proc 7 (1998), 359-369.

Trier and Taxt and Trier and Jain evaluated eleven locally adaptive thresholding methods on gray scale document images with low contrast, variable background intensity and noise. See Ø.D. Trier and T. Taxt, "Evaluation of binarization methods for document images", IEEE trans on Pattern Analysis and Machine Intelligence 17 (1995), 312-315, and Ø.D. Trier and A. K. Jain, "Goal-directed evaluation of binarization methods", IEEE Trans on Pattern Analysis and Machine Intelligence 17 (1995), 1191-1201.

SUMMARY OF THE INVENTION

The inventors have developed a method which is capable, for example, of automatic segmentation of nuclei from Feulgen stained tissue sections. Automatic segmentation of nuclei from these sections is difficult because; 1) the cells may be clustered, 2) the image background varies, 3) there are intensity variations within the nuclei, and 4) the nuclear boundary may be diffuse.

The method of the invention may be based on several steps in order to 1) detect the nuclei 2) optimize the initial contours for the snakes (i.e., finding a coarse segmentation of the nuclei) and 3) optimize the convergence of the snakes (i.e. performing the final segmentation of the nuclei), addressing the "capture range problem" indicated above.

The thresholding and post-processing steps may be carried out on a resized image shrunk by a predetermined factor. This speeds up these steps without greatly impacting the effects of the method. The images may be scaled by a factor in the range 0.2 to 0.7, 0.4 to 0.6, or about 0.5.

The thresholding step may calculate for each pixel $(i,j)$ a threshold t based on $t=m(i,j)+k.s(i,j)$ where m and s are the mean and standard deviation of a neighborhood of pixels around the pixel $(i,j)$ and k is a constant in the range 0.1 to 0.4.

The post-processing step may include:
labelling all objects and holes in the black and white image;
calculating the average gradient magnitude of the grey scale image around the boundary of each labelled object and hole;
removing objects for which the average gradient magnitude does not exceed a predetermined threshold;
filling holes; and
removing objects with an area less than a predetermined number of pixels.

The predetermined number of pixels may be 5 to 50, preferably around 10. The predetermined threshold may be 0.05 to 0.2, or 0.08 to 0.12.

The method may further comprising smoothing the gray scale image with a Gaussian filter and convolving the grey scale image with the derivative of a Gaussian before calculating the average gradient magnitude. The standard deviation of the Gaussian filter used may be in the range 1.5 to 2.5.

Segmenting may include extracting a sub image from the grey-scale image corresponding to each object remaining after the post-processing step.

The step of applying an edge detector may apply a Canny edge detector. The standard deviation of the Gaussian filter in the edge detector may be set to 1.5 to 2.5, or around 2.0, and high and low threshold values may be set to 0.1 to 0.25 for the low threshold and 0.6 to 0.8 for the high threshold.

A gradient vector flow snake method may be applied, using a regularization coefficient of 0.1 to 0.3 and at least 10 iterations, for example 50 to 100 iterations.

At least a portion of the steps described above are performed by a process defined by code executing within a processor of a computer. The code can comprise software instructions that are provided to a physical memory that is accessible to the processor of the computer.

The invention also relates to a computer program product adapted to cause a computer to carry out a method as set out above.

BRIEF DESCRIPTION OF THE DRAWINGS

For a better understanding of the invention, embodiments will be described, purely by way of example, with reference to the accompanying drawings, in which.

DETAILED DESCRIPTION OF CERTAIN EMBODIMENTS OF THE INVENTION

1 Materials and Methods
1.0 Apparatus

It is to be appreciated that certain embodiments of the invention as discussed below may be incorporated as a software algorithm, program or code residing in firmware and/or on computer useable medium (including software modules and browser plug-ins) having control logic for enabling execution on a computer system having a computer processor. Such a computer system typically includes memory storage configured to provide output from execution of the computer algorithm or program.

Figure 10:
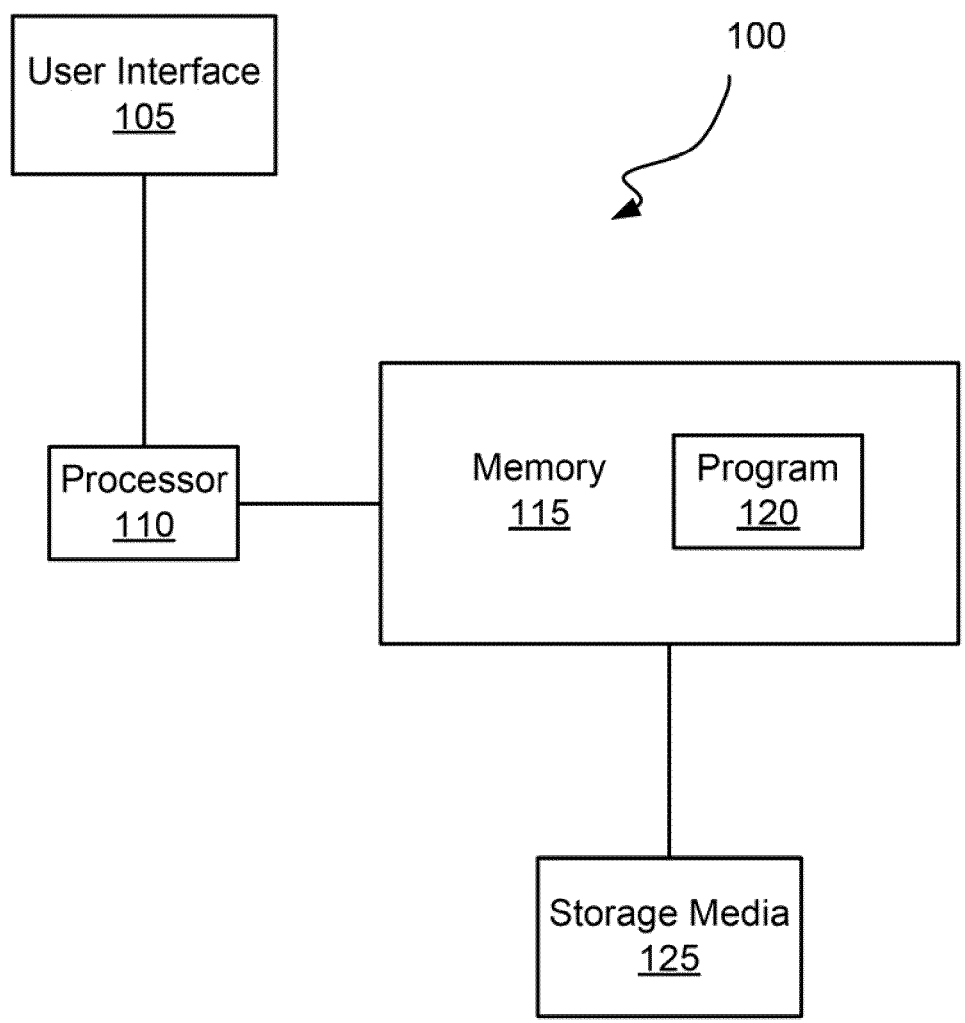
FIG. 10 illustrates a hardware arrangement suitable for implementing methods in accordance with the invention.

With brief reference first to FIG. 10, an exemplary computer system is shown as a block diagram which depicts a computer system 100. Although system 100 is represented herein as a standalone system, it is not limited to such, but instead can be coupled to other computer systems via a network (not shown) or encompass other embodiments as mentioned below. System 100 preferably includes a user interface 105, a processor 110 (such as a digital data processor), and a memory 115. Memory 115 is a physical memory for storing data and instructions suitable for controlling the operation of processor 110. An implementation of the memory 115 can comprise, by way of example and not limitation, any variety of RAM, magnetic storage, or optical storage. One of the components stored in memory 115 is a program 120.

Program 120 includes a set of instructions (code) for controlling processor 110. The code can be arranged as firmware or software, and can be organized as a set of modules such as discrete code modules, function calls, procedure calls or objects in an object-oriented programming environment. If implemented using modules, program 120 can comprise a single module or a plurality of modules that operate in cooperation with one another. Program 120 is contemplated as representing a software embodiment of the methods described herein.

User interface 105 can include an input device, such as a keyboard, touch screen, tablet, or speech recognition subsystem, for enabling a user to communicate information and command selections to processor 110. The input device can be used, among other things, in order to set the parameters of a segmentation algorithm. User interface 105 also includes an output device such as a display or a printer. In the case of a touch screen, the input and output functions are provided by the same structure. A cursor control such as a touch-screen, mouse, track-ball, or joy stick, allows the user to manipulate a cursor on the display for communicating additional information and command selections to processor 110. In embodiments of the present invention, the program 120 can execute entirely without user input or other commands based on programmatic or automated access to a data signal flow through other systems that may or may not require a user interface for other reasons, once the segmentation parameters have been defined.

While program 120 is indicated as already loaded into memory 115, it may be configured on a storage media 125 for subsequent loading into memory 115. Storage media 125 can be any conventional storage media such as a magnetic tape, an optical storage media, a compact disc, or a floppy disc, each of which is computer-readable. Alternatively, storage media 125 can be a random access memory, or other type of electronic storage, located on a remote storage system, such as a server that delivers the program 120 for installation and launch on a user device.

It is to be understood that the invention is not to be limited to such a computer system 100 as depicted in FIG. 10, but rather may be implemented on a general purpose personal computer, a workstation, a desktop computer, a laptop computer, a netbook computer, a personal digital assistant (PDA), a smart phone, or other handheld electronic devices having a processor and a memory.

1.1 Tissue Preparation

Paraffin embedded tissue samples fixed in 4% buffered formalin were sectioned (5 μm). The tissue sections were first stained with H&E, then de-stained and re-stained with Feulgen.

1.2 Image Acquisition

The Zeiss Axiolmager Z1 automated microscope equipped with a 63/1.4 objective lens, a 546 nm green filter and a black and white high-resolution digital camera (Axiocam MRM, Zeiss) with 1040×1388 pixels and a gray level resolution of 12 bits per pixel was used to capture each image field. The pixel resolution was 102 nm per pixel on the tissue specimen.

The images were passed to image processing apparatus arranged to take an input digital image from the digital camera and output one or more processed digital image(s) with the nuclei segmented. The image processing apparatus may be implemented in hardware or software; each of the method steps described below may be implemented in separate hardware or software or alternatively a single unit of hardware or software may implement some or all of the steps.

1.2.1 Preprocessing

Figure 1:
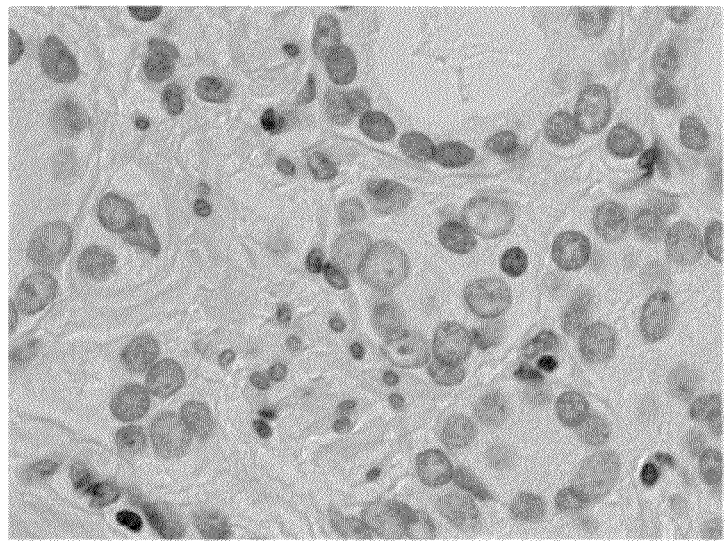
FIG. 1 is an original image, and the shade corrected frame image.
Figure 1:
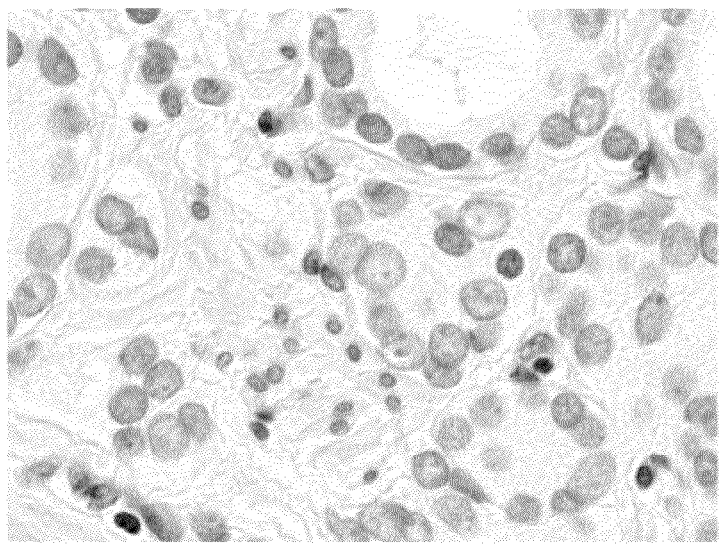

Varying illumination, reflectance and optical transmission over the field of view may play a role in the success of any image segmentation algorithm based on gray level thresholding. Although a locally adaptive thresholding method is used to detect the cell nuclei within each frame image, we still want to remove such shading effects. Thus, a shade correction was performed for each image field, i.e., each frame image was divided by a background image. FIG. 1A shows an example of a frame image, the corresponding shade (background) image and the shade corrected frame image. In the present study, we use this frame image to illustrate the different steps of our segmentation method. Each frame image was inverted in order to obtain "bright" objects (nuclei) on a "dark" background.

The images were then filtered with a 5×5 median filter, i.e., the gray level of each pixel in the image was replaced by the median of the gray levels in a 5×5 neighborhood of that pixel. This was done in order to reduce possible noise without too much blurring of edges.

1.3 Optimizing the Initialization and Convergence of Nuclear Snakes 1.3.1 Detecting the Nuclei/Making a Binary Seed Image For the object detection step, we do not need the full resolution of the frame images. Therefore, the preprocessed frame images were resized by a scale factor of 0.5 (i.e., scrinked by a factor of two) using bicubic interpolation and anti-aliasing, i.e., the output pixel value was a weighted average of the pixels in the nearest 4×4 neighborhood.

The resized frame images were then thresholded by using the Niblack method of local adaptive thresholding—see W. Niblack, An Introduction to Digital Image Processing, Prentice Hall, 1986. For each pixel (i,j) in the image a threshold is calculated. The threshold is computed from the mean and standard deviation of the pixel gray level values within a neighborhood of the pixel.

For each pixel (i, j) in the frame image f(i, j) a threshold was calculated as $$t(i,j) = m(i,j) + k \times s(i,j),$$

where m and s are the mean and standard deviation of the gray level values within a neighborhood of (i,j) and k is a constant. We found that a neighborhood of 75×75 pixels and a k-value of 0.2 gave good results on our images. A binary (thresholded) image b(i, j) was then obtained by performing the following transformation of the gray scale frame image f(i, j)

$$b(i, j) = \begin{cases} 1, & f(i, j) \geq t(i, j) \\ 0, & f(i, j) < t(i, j) \end{cases}$$

where t(i, j) is the threshold

Figure 2:
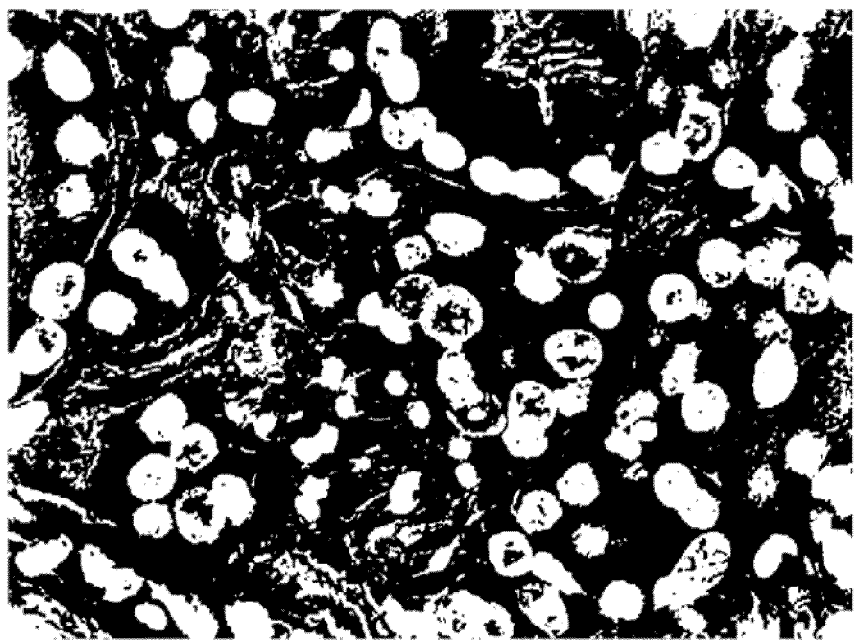
FIG. 2 is the image obtained after local adaptive thresholding.

The results are shown in FIG. 2.

The post-processing step of S. D. Yanowitz and A. M. Bruckstein, "A new method for image segmentation", Computer Vision, Graphics, and Image Processing 46 (1989), 82-95 was then applied, on the thresholded frame image. In this approach, after segmenting an image, the post-processing step of Yanowitz and Bruckstein is used to remove false objects. This is done by looking at the gradient along the contour of each object. The average gradient value (computed from the gray level image) is computed for each object. If the average gradient value of a given object is lower than a defined threshold, then the object is regarded as a false object and removed from the image.

In particular, all the connected components (i.e., both objects and holes) in the thresholded image were labeled. This was done by computing a label matrix L, i.e., a 2-D matrix of non-negative integers that represent contiguous regions. The k-th region includes all elements in L that have value k. The zero-value elements of L make up the background Image—see Processing ToolBox User's Guide, Version 5, The MathWorks, Inc. 2004.

Figure 3:
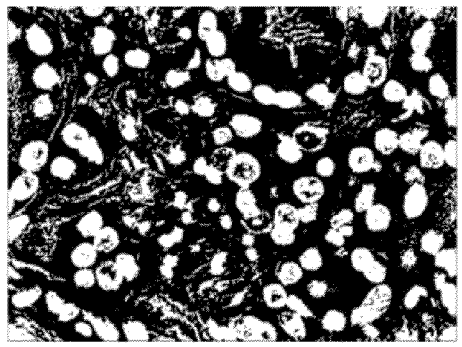
FIG. 3 is the image after post-processing.
Figure 3:
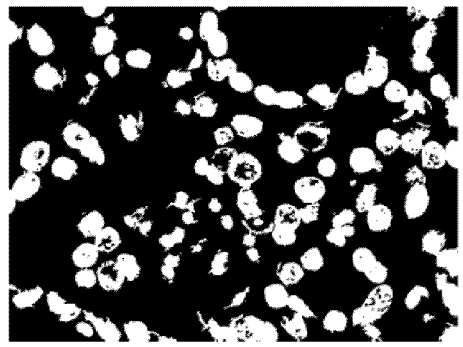

The boundaries of all labeled objects and holes (see FIG. 3 (a)) were then scanned and the average gradient magnitude of each object (or hole) boundary was computed from the corresponding gradient values. In order to compute the gradient magnitude of the gray level frame image the image was first smoothed by a Gaussian filter and then convolved with the derivative of a Gaussian [10]. The standard deviation of the Gaussian filters was set to σ=2.0. If the average gradient magnitude of a given boundary did not exceed a certain threshold, then the object was removed from the image. We used a threshold value of 0.1, see FIG. 3 (b).

The holes in the binary image were then filled by using an algorithm based on morphological reconstruction see P. Soille, Morphological Image Analysis: Principles and Applications, Springer-Verlag, 1999, pp. 173-174. A hole was defined as a set of background pixels that cannot be reached by filling in the background from the edge of the image. 4-connected background neighbours were used.

Figure 4:
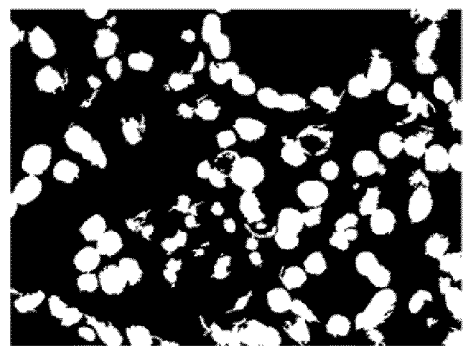
FIG. 4 is the image after filling holes and removing objects.
Figure 4:
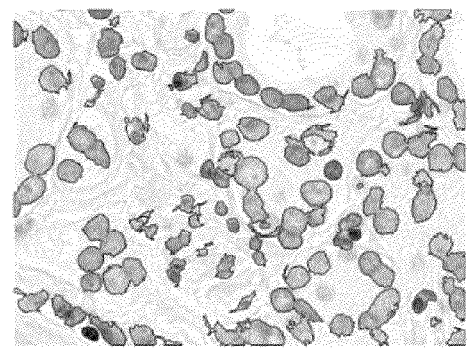

Finally, small objects (with area less than 11 pixels) were removed from the image. All the objects in the binary image were labelled. Blob analysis was then performed on the labelled objects and a structure array of length N (containing the area of each object) was returned, where N was the number of objects in the binary image. All elements of the structured array that had an area greater than 10 pixels were identified and the linear indices of those elements were returned. The resulting binary image containing objects with area ≥11 pixels is shown in FIG. 4 (a) and the shade corrected frame image with the corresponding object boundaries is shown in FIG. 4 (b).

Figure 5:
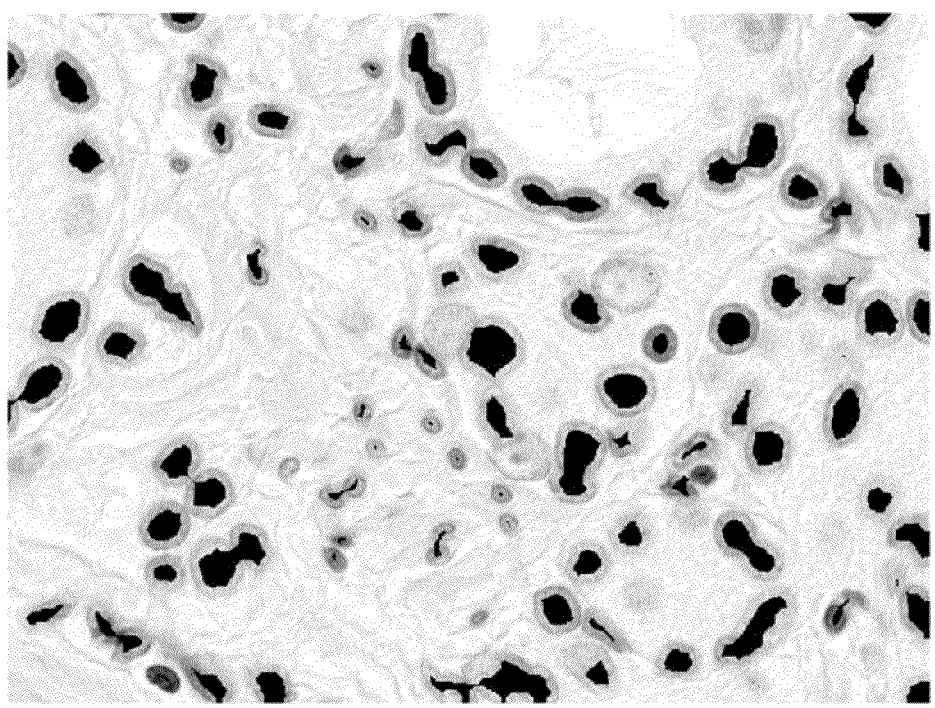
FIG. 5 indicates seeds added on the original frame image.

The binary images were then resized back to original size (by using a scale factor of 2.0). In order to produce "seeds" ("seed" is defined here as a subset of an object mask) for the nuclei, the binary image was eroded with a disk shaped structuring element with a radius of 21 pixels. FIG. 5 shows our example frame with the resulting seeds added.

Figure 6:
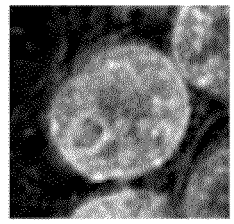
FIG. 6 shows examples of sub-images.
Figure 6:
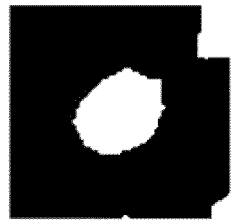
Figure 6:
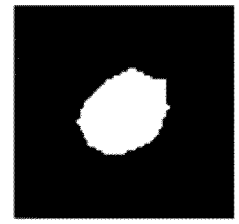
Figure 6:
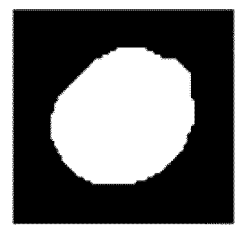
Figure 6:
Figure 6:
Figure 6:
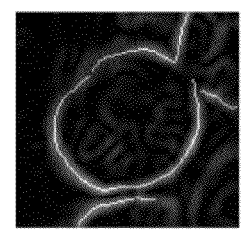
Figure 6:
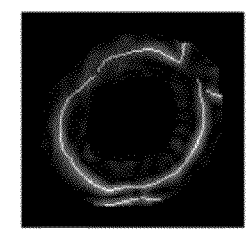
Figure 6:
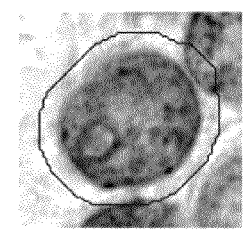

1.3.2 A Coarse Segmentation of the Nuclei—Optimizing the Initial Contours for the Snakes The "seeds" in the "seed image" were used to extract sub-images of individual nuclei from the frame image. Each connected component ("seed") in the "seed image" was labeled. Seeds which included frame boundary pixels were excluded. Based on the bounding box of each "seed", i.e., the smallest rectangle containing the seed (with coordinates of the upper left corner x-min, y-min and size x-width, y-width), a sub-image (corresponding to a larger rectangle with coordinates x-min-60, y-min-60, x-width+120, y-width+120) was extracted from the frame image, see FIG. 6 (a). (If the largerrectangle was outside the frame image the size of the rectangle was reduced). A corresponding sub-image was extracted from the seed image, see FIG. 6 (b). "Seeds" corresponding to other nuclei were removed from the "seed" sub-image, see FIG. 6 (c). In order to reproduce the original object mask (which was eroded with a disk shaped structuring element with a radius of 21 pixels, see Section 1.3.1), the "seed" was dilated with the same structuring element (i.e., a disk shaped structuring element with a radius of 21 pixels), see FIG. 6 (d). In order to produce a larger mask, the reproduced object mask was dilated with a disk shaped structuring element with a radius of 11 pixels. In order to produce a smaller mask, the reproduced object mask was eroded with a disk shaped structuring element with a radius of 15 pixels. The boundary of the larger mask was used as a start contour for the snake (see FIG. 6 (i)).

1.3.3 Optimizing the Convergence of the Nuclear Snakes

The Canny edge detector was applied on the gray level sub-image. This is described in J. Canny, A computational approach to edge detection, IEEE Trans Pattern Analysis and Machine Intelligence 8 (1986), 679-714. This edge detector computes thin connected edge segments by performing the following four steps:

a. The image is smoothed by a Gaussian filter (in order to remove noise).
b. The edges are detected by computing the gradient (magnitude and direction).
c. The edges is thinned d. Weak edges that are not connected to strong edges are removed (by using a low intensity threshold, a high intensity threshold (in the gradient magnitude image) and contour following.

The standard deviation of the Gaussian filters was set to σ=2.0 and the low and high threshold values were set to (TL=0.18, TH=0.7). The resulting Canny edge map (FIG. 6 (*e*)) was added with the gradient magnitude (which was computed by first smoothing the image by a Gaussian filter and then convolving with the derivative of a Gaussian, FIG. 6 (*f*)) to produce the image show in FIG. 6 (*g*). This image was then "cleaned up" based on the larger and the smaller mask produced above (Section 1.3.2). All pixel values corresponding to pixels with value 0 in the "larger mask" binary image was set to 0 and all pixel values corresponding to pixels with value 1 in the "smaller mask" binary image was also set to 0, resulting in a bounded, annular edge map, see FIG. 6 (*h*).

The gradient vector flow (GVF) snake was used. This is described in C. Xu and J. L. Prince, Gradient Vector Flow (GVF) Active Contour Toolbox, down-loaded from: http://iacl.ece.jhu.edu/projects/gvf, and C. Xu and J. L. Prince, Snakes, shapes, and gradient vector flow, IEEE Trans Imag Proc 7 (1998), 359-369. In summary, a transformation of the digital gray level image f(i,j) into a binary (black and white) image b(i,j) is performed. A gray level threshold T is defined, and all pixels (i,j) with a pixel gray level value f(i,j) greater or equal to T are transformed to 1 (i.e. pixel value 1, white) and all pixels (i,j) with a pixel gray level value f(i,j) less than T are transformed to 0 (i.e. pixel value 0, black).

In the example, the GVF of the bounded annular edge map was computed. The GVF regularization coefficient μ was set to 0.2 and the number of iterations was set to 80. The GVF was then normalized and used as an external force field. The points in the snake start contour were interpolated to have equal distances. The desired resolution between the points was set to 0.8. The snake was deformed in the given external force field. The internal force parameters were set as follows: elasticity α=5.0, rigidity β=10.0, viscosity γ=1. The external force weight κ=0.6. The snake deformation was iterated 30 times. After each deformation the snake was interpolated to have equal distances (with the desired resolution between the points set to 0.8).

Figure 7:
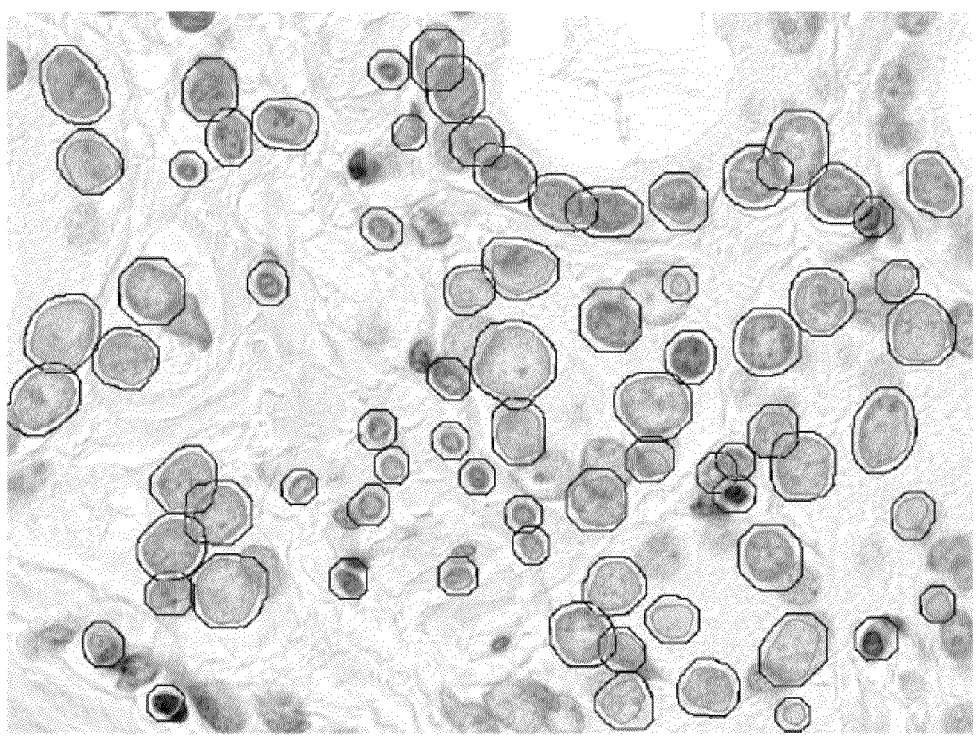
FIG. 7 illustrates splitting nuclei.

The results are shown in FIG. 7.

1.3.4 Saving the Segmentation Mask of Each Iteration

A mask was created for each segmented nucleus using the Matlab function poly2mask to create a plurality of masks representing segmented nucleii. A nucleus was defined as successfully segmented if the segmentation mask satisfied the following criteria:

The solidity of the mask was greater or equal to 0.97. The solidity of the binary mask is the proportion of the pixels in the convex hull that are also in the binary mask (solidity=number of pixels in the binary mask/number of pixels in the convex hull).

The average gradient value along the boundary of the mask was greater than 0.3

The area of the mask was greater than 450 and less than 16000 pixels

If the nucleus was successfully segmented then i) the reconstructed object mask was stored in a binary image "reconstructed object masks" and ii) the final segmentation mask was stored in a "mask image" as a labeled connected component.

The segmentation method was iterated by using different parameter values in the local adaptive thresholding (i.e., the size of the neighborhood in the Niblack method). For each iteration, the masks of all nuclei that were successfully segmented in the present iteration and that were not segmented in a previous iteration were stored in an image as labeled connected components.

If there was an overlap between the current segmentation mask and a previous stored mask, then the pixel values of the pixels in the overlapping area were set to a high value (200). An overlap between the present segmentation mask and a previous defined segmentation mask of less than 5% (of the area of the present mask) was accepted. If the overlap was between 5% and 25%, then the overlapping masks were split.

1.3.5 Splitting Overlapping Masks

Two overlapping segmentation masks were split by first identifying the two points where the boundaries of the two masks intersected and then drawing a straight line between these two points. The Bresenham line algorithm determines which pixels in the 2D image that should be included in order to form a close approximation to a straight line between two given points.

By splitting the segmentation masks, separate nuclei could be obtained even when the nuclei overlap, which is common in real images. Thus, masks in the plurality of masks created in step 1.3.4 above were replaced by the split masks in this step.

Figure 8:
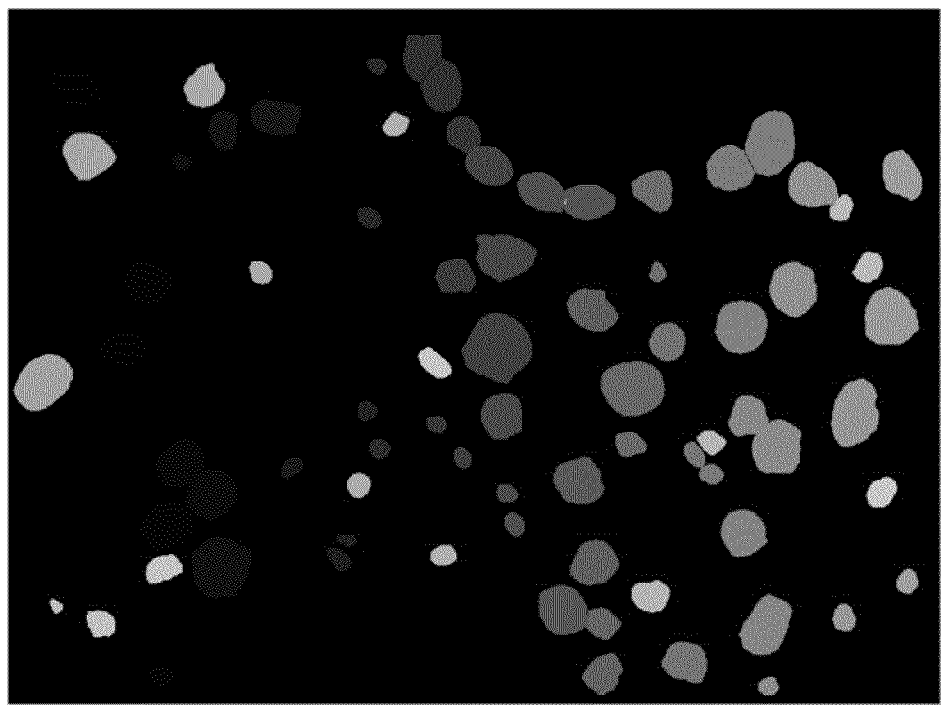
FIG. 8 shows the segmentation result.

FIG. 8 shows the image containing the final segmentation masks (after splitting overlapping masks). The image output includes the plurality of masks after the splitting step, and is a transformed image simply having a region indicating the location of each of the masks, the region being a "blob" in this instance though alternative embodiments may represent the region differently, for example using a line drawing around the perimeter of the region.

It was found that splitting overlapping masks in this way gave better results.

2.0 Results

Trained personnel (experts) performed the manual segmentation using a Wacom drawing table and pen and special-written software. Starting with the first frame from each case, in-focus, non-overlapping nuclei were selected from consecutive frames. The experts tried to draw the line just outside the nuclei, i.e., the area lying inside the line was regarded as the nucleus. We note that the precision of this line may depend on several factors, e.g., the experience of the expert, the speed of drawing, the software used, etc. The total data set of manually segmented nuclei consists of about 2000 cell nuclei from each case. The number of frames needed to obtain this was; 95 frames from case 1, 109 frames from case 2, and 79 frames from case 3. The first two frames from case 1 (frame_0, frame_1) were used to develop the segmentation method. The first frame is used as an "example frame". The method was then tested on 13 randomly selected frames from case 1 (including frame_0 and frame_1), 8 randomly selected frames from case 2, and 9 randomly selected frames from case 3. For each case, every eight frame were selected. Some of these selected frames were excluded because they did not contain any manually segmented nuclei (6 were excluded from case 2 and 1 were excluded from case 3), resulting in the number of frames given above.

A manual segmentation was regarded as erroneous if more than 5% of the area of a segmentation mask overlapped with another mask. Thus, the overlapping nuclei were regarded as an incorrect manual segmentation and were excluded from the evaluation below.

Figure 9:
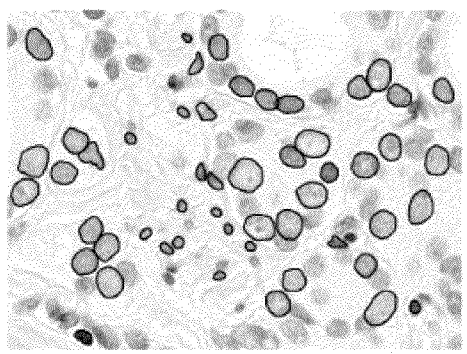
FIG. 9 examples of images segmented both manually and automatically.
Figure 9:
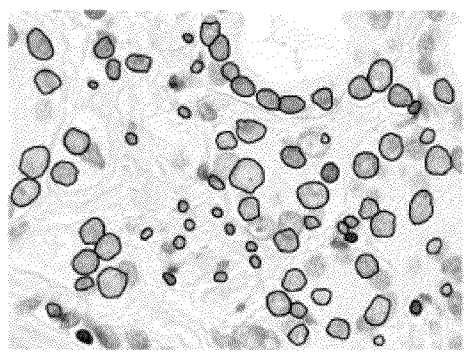
Figure 9:
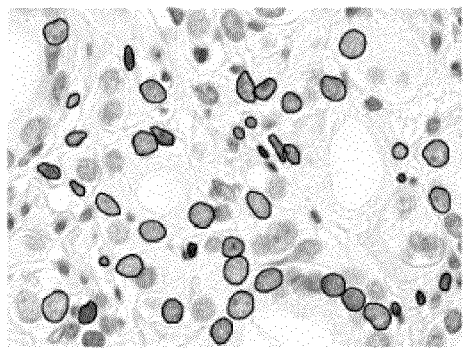
Figure 9:
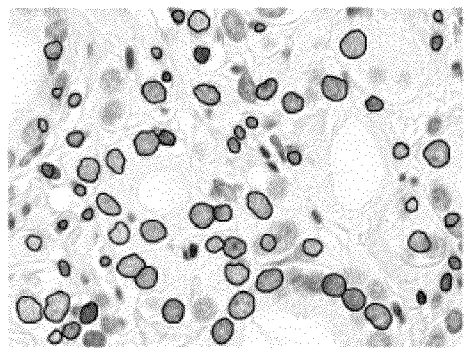

FIG. 9 shows the result of manual and automatic segmentation for our training frames. FIGS. 9 (*a*) and (*c*) are the results of manual separation and FIGS. 9 (*b*) and (*d*) the results of automatic segmentation. Automatic segmentation produced generally better results. In particular, it was found that when humans carried out manual segmentation many of the smaller nucleii in the image were missed. Automatic segmentation therefore generally identified more nuclei. Without wishing to be bound by theory, the task of manual segmentation is relatively repetitive and boring and it is believed therefore that the human users took less care after the more obvious nuclei were segmented.

2.1 Discussion

The development of an automatic cell nucleus segmentation procedure to replace manual segmentation is motivated by the need to save time and cost in handling increasing volumes of images. But an overriding concern is the agreement between the two methods. Can we use segmentation results from the two approaches interchangeably, i.e., can we ignore whether the segmentation is done by an expert or by the automatic algorithm?

There are several aspects to consider:
1. Does the automatic algorithm segment the same (number of) cell nuclei as the experts do?
2. For the manually segmented nuclei that are also segmented by the automatic method, we need to inspect the accuracy of the segmentation result.
3. For the cell nuclei that are only segmented by one of the methods, we need to check if there are any systematic differences in typical nuclear parameters.

The result of the proposed segmentation method depends on a sequence of image processing steps containing a large number of parameter values. The importance of including each step and the robustness or stability of the method has been analyzed by changing one parameter value at a time, keeping the other parameter values constant.

The adaptive thresholding of the graylevel frame images is clearly important and the post-processing step is important in cleaning up the binary frame image (FIG. 3 (b)). A $\delta$-value of 0.2 gave good results, but changing this to 0.1 or 0.3 did not influence the sensitivity or specificity. Thus, $\delta$-values in the range 0.1 to 0.3 may be used. The object validation step of involves a threshold on the gradient along the perimeter of the object candidate (here chosen as 0.1). A 50% change in this parameter did not influence the sensitivity or specificity.

Another crucial component of the method is the GVF snake. Initial tests using a traditional snake required a very precise initialization, and therefore gave poor results. Using the GVF snake with an annular edge map, on the other hand, produced very satisfactory results. Halving the elasticity and rigidity parameters from ($\alpha$=5, $\beta$=10) to ($\alpha$=2.5, $\beta$=5) reduced the number of detected nuclei from 71 to 67% of the manually segmented nuclei, but did not affect sensitivity and specificity. Reducing the external force weight from $\kappa$=0.6 to 0.5 increased the number of detected nuclei from 71 to 73% of the manually segmented nuclei, but again this did not affect sensitivity or specificity. The number of iterations (of the snake deformation) was set to 30, Experiments have shown that increasing the number of iterations did not improve the results, and that the same results are obtained by just 10 iterations. The GVF regularization coefficient, on the other hand, will influence the results. It was set to $\mu$=0.2, and increasing it to $\mu$=0.3 brought the sensitivity down from 95% to 94%, the specificity down from 96% to 89%, and the number of detected nuclei from 71 to 60% of the manually segmented nuclei. Decreasing it to $\mu$=0.1 lowered the number of detected nuclei from 71 to 69% of the manually segmented nuclei but did not affect the sensitivity or specificity.

Thus ranges of $\mu$ in the range 0.1 to 0.3 may all be usable.

The automatically segmented images output by the method discussed above may be processed in a number of ways to obtain various, parameters useful for medicine. One example where the segmented nucleii may be used is discussed further in co-pending patent application GB1003188.8.

Optional embodiments of the invention can be understood as including the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although illustrated embodiments of the present invention have been described, it should be understood that various changes, substitutions, and alterations can be made by one of ordinary skill in the art without departing from the present invention which is defined by the recitations in the claims below and equivalents thereof.

We claim:

1. A computer-implemented segmentation method for processing a gray-scale image made up of a plurality of pixels on a display, the image representing a plurality of nuclei, the method comprising:
   providing a set of instructions to a physical memory of the computer;
   configuring a processor of the computer by executing the set of instructions in the physical memory so as to automatically segment the image by:
   (a) setting at least one parameter in the segmentation algorithm,
   (b) thresholding the grey-scale image to create a black and white image;
   (c) post-processing to identify objects in the black and white image and to remove objects failing to meet predetermined criteria based on the black and white image and the gray-scale image;
   (d) segmenting to extract objects corresponding to the objects remaining after the post-processing step;
   (e) applying an edge detector on the segmented image to identify the edges of nuclei;
   (f) creating a mask for each nucleus to create a plurality of masks;
   (g) where masks overlap by a predetermined range of overlaps, splitting the overlapping masks to replace the overlapping masks in the plurality of masks, wherein the predetermined range of overlaps is from a lower bound to an upper bound of overlap area as a percentage of the combined area of the masks, the lower bound is in the range 1% to 10%, preferably 3% to 7%, and the upper bound is in the range 15% to 40%, preferably 20% to 30%; and
   (h) providing as an output a transformed image made up of mask regions representing the plurality of masks representing respective nuclei.

2. A segmentation method according to claim 1, further comprising repeating steps (a) to (g) iteratively for a plurality of different thresholding parameters, wherein step (g) includes splitting masks for each iteration that overlap with masks for previous iterations.

3. A method according to claim 1 wherein the thresholding and post-processing steps are carried out on a resized image shrunk by a predetermined factor.

4. A method according to claim 1 wherein segmenting includes extracting a sub-image from the grey-scale image corresponding to each object remaining after the post-processing step.

5. A method according to claim 1 wherein the step of applying an edge detector applies a Canny edge detector.

6. A method according to claim 1 wherein the step of applying an edge detector applies a gradient vector flow snake.

7. A computer-implemented segmentation method for processing a gray-scale image made up of a plurality of pixels on a display, the image representing a plurality of nuclei, the method comprising:
providing a set of instructions to a physical memory of the computer;
configuring a processor of the computer by executing the set of instructions in the physical memory so as to automatically segment the image by:
(a) setting at least one parameter in the segmentation algorithm,
(b) thresholding the grey-scale image to create a black and white image, wherein the thresholding step calculates for each pixel (i,j) a threshold t based on $t=m(i,j)+k.s(i,j)$ where m and s are the mean and standard deviation of a neighborhood of pixels around the pixel (ij) and k is a constant in the range 0.1, to 0.4;
(c) post-processing to identify objects in the black and white image and to remove objects failing to meet predetermined criteria based on the black and white image and the gray-scale image;
(d) segmenting to extract objects corresponding to the objects remaining after the post-processing step;
(e) applying an edge detector on the segmented image to identify the edges of nuclei;
(f) creating a mask for each nucleus to create a plurality of masks;
(g) where masks overlap by a predetermined range of overlaps, splitting the overlapping masks to replace the overlapping masks in the plurality of masks; and
(h) providing as an output a transformed image made up of mask regions representing the plurality of masks representing respective nuclei.

8. A computer-implemented segmentation method for processing a ray-scale image made of a plurality of pixels on a display, the image representing a plurality of nuclei, the method comprising:
providing a set of instructions to a physical memory of the computer;
configuring a processor of the computer by executing the set of instructions in the physical memory so as to automatically segment the image by:
(a) setting at least one parameter in the segmentation algorithm,
(b) thresholding the grey-scale image to create a black and white image;
(c) post-processing to identify objects in the black and white image and to remove objects failing to meet predetermined criteria based on the black and white image and the gray-scale image, wherein the post-processing step includes:
labeling all objects and holes in the black and white image;
calculating an average gradient magnitude of the grey scale image around the boundary of each labeled object and hole;
removing objects and holes for which the average gradient magnitude does not exceed a predetermined threshold;
filling holes; and
removing objects with an area less than a predetermined number of pixels;
(d) segmenting to extract objects corresponding to the objects remaining after the post-processing step;
(e) applying an edge detector on the segmented image to identify the edges of nuclei;
(f) creating a mask for each nucleus to create a plurality of masks;
(g) where by a predetermined range of overlaps, splitting the overlapping masks to replace the overlapping masks in the plurality of masks; and
(h) providing as an output a transformed image made up of mask regions representing the plurality of masks representing respective nuclei.

9. A method according to claim 8 further comprising smoothing the gray scale image with a Gaussian filter and convolving the grey scale image with the derivative of a Gaussian before calculating the average gradient magnitude.

10. A computer program product comprising a non-transitory computer-readable storage medium having code stored thereon, the code being executable on a processor of a computer to cause the processor to perform a segmentation method on a grey scale image using the steps of:
(a) setting, in the processor, at least one parameter in the segmentation algorithm,
(b) thresholding the grey-scale image, in the processor, to create a black and white image;
(c) post processing, in the processor, to identify objects in the black and white image and remove objects failing to meet predetermined criteria based on the black and white image and the gray-scale image;
(d) segmenting, in the processor, to extract objects corresponding to the objects remaining after post-processing from the gray-scale image;
(e) applying an edge detector on the segmented image, in the processor, to identify the edges of nuclei;
(f) creating a mask, in the processor, for each segmented nucleus; and
(g) where masks overlap by a predetermined range of overlaps, splitting, in the processor, the overlapping masks, wherein the predetermined range of overlaps is from a lower bound to an upper bound of overlap area as a percentage of the combined area of the masks, the lower bound is in the range 1% to 10%, preferably 3% to 7%, and the upper bound is in the range 15% to 40%, preferably 20% to 30%.

11. A computer program product according to claim 10, further comprising repeating in the processor steps (a) to (g) iteratively for a plurality of different thresholding parameters, wherein step (g) includes splitting masks for each iteration that overlap with masks for previous iterations.

12. A computer program product according to claim 10 wherein the thresholding step calculates, in the processor, for each pixel (i,j) a threshold t based on $t=m(i,j)+k.s(i,j)$ where m and s are the mean and standard deviation of a neighborhood of pixels around the pixel (i,j) and k is a constant in the range 0.1, to 0.4.

13. A computer program product according to claim 10 wherein the post-processing step includes:
labelling, in the processor, all objects and holes in the black and white image;
calculating, in the processor, the average gradient magnitude of the grey scale image around the boundary of each labeled object and hole;
removing, in the processor, objects and holes for which the average gradient magnitude does not exceed a predetermined threshold;
filling holes, in the processor; and removing objects, in the processor, with an area less than a predetermined number of pixels.

\* \* \* \* \*